Nov. 30, 1943.    W. F. F. MARTIN-HURST    2,335,778
RELIEF VALVE FOR STEAM OR OTHER PRESSURE VESSELS
Filed June 25, 19—    3 Sheets-Sheet 1

INVENTOR
William Frederick Forrest Martin-Hurst
By
ATTORNEYS

Nov. 30, 1943. W. F. F. MARTIN-HURST 2,335,778
RELIEF VALVE FOR STEAM OR OTHER PRESSURE VESSELS
Filed June 25, 1942 3 Sheets-Sheet 3

INVENTOR
William Frederick Farrest Martin-Hurst
By Norris L Bateman
ATTORNEYS

Patented Nov. 30, 1943

2,335,778

UNITED STATES PATENT OFFICE 2,335,778

RELIEF VALVE FOR STEAM OR OTHER PRESSURE VESSELS

William Frederick Forrest Martin-Hurst, Sunbury-on-Thames, England

Application June 25, 1942, Serial No. 448,462
In Great Britain February 17, 1942

5 Claims. (Cl. 236—92)

This invention relates to valves for the protection of steam or other pressure vessels by relieving excessive or low pressure automatically and has particular, although not exclusive, reference to the protection of the liquid cooling system of aircraft engines such as that known as the "pressure cooling system" wherein the invention is designed to provide a safeguard for the hermetically sealed water jacket, header tank, radiator and connections.

The object of the present invention is to provide an improvement in or modification of the invention claimed in my prior Patent No. 2,290,059 and according to the invention the movable valve member is adapted to be moved away from the movable valve seat to relieve excessive pressure in the system or vessel to be protected against the action of a preloaded spring whose upper end bears against a fixed stop and whose lower end bears against an element fixed to a freely mounted axially movable rod whose range of movement determines the maximum degree of movement of the said valve member in opening to relieve excess pressure.

Reference will now be made to the accompanying drawings which illustrate by way of example a valve, constructed according to the invention and in which—

Figure 1:
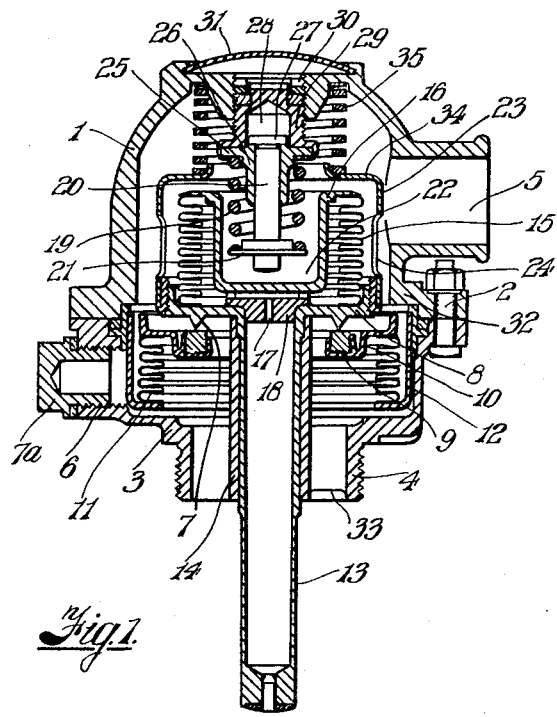
Figure 4:
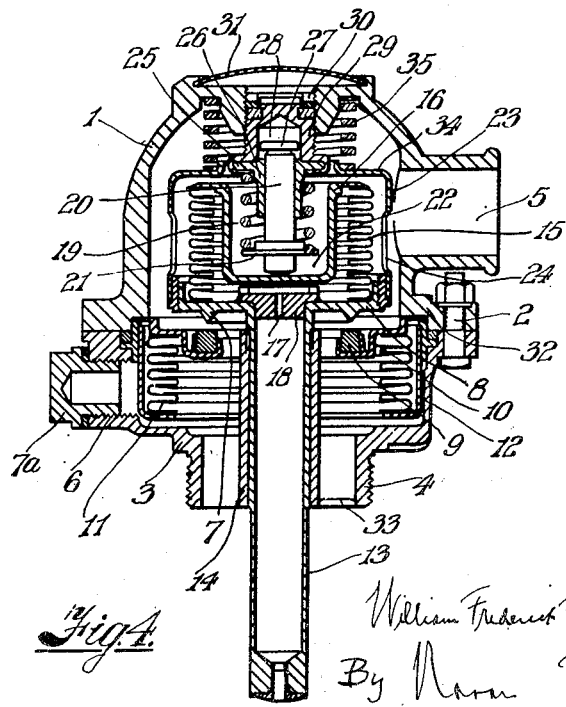
Figure 2:
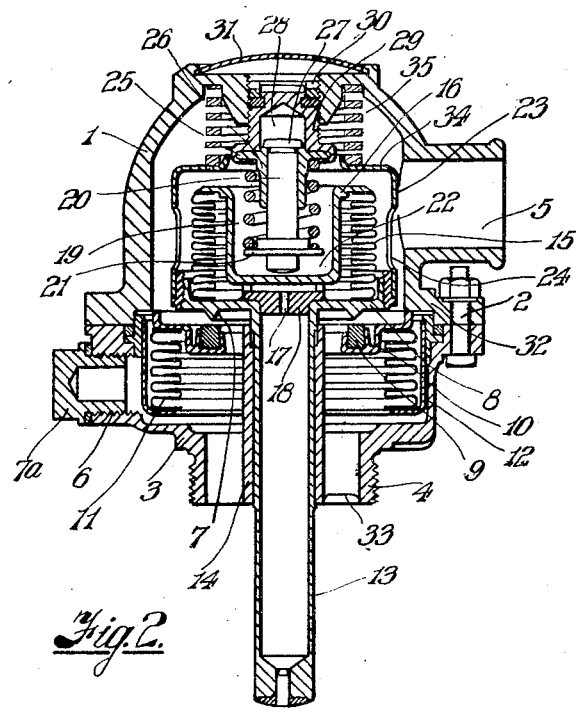
Figure 5:
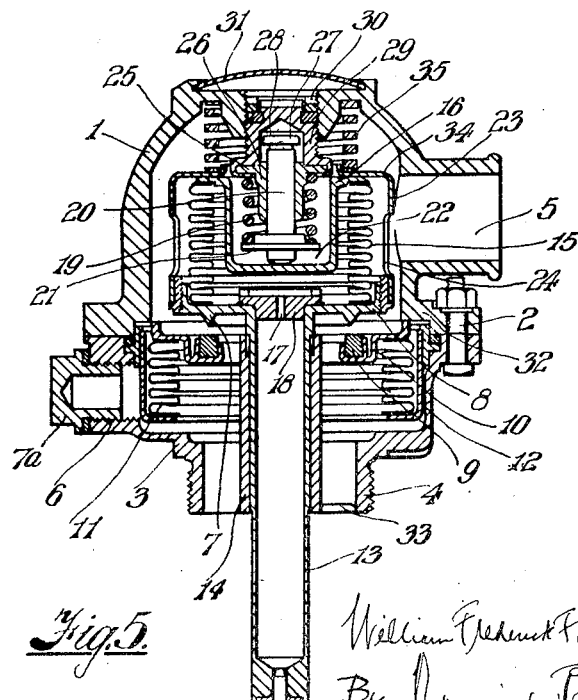
Figure 3:
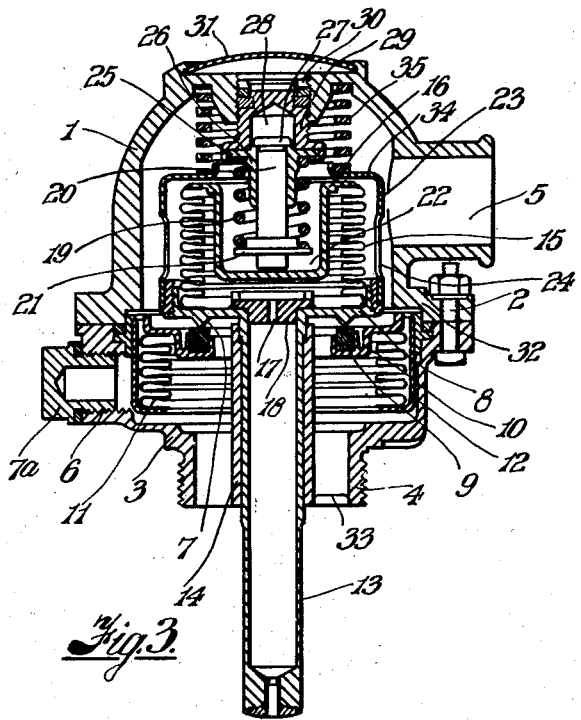
Figure 6:
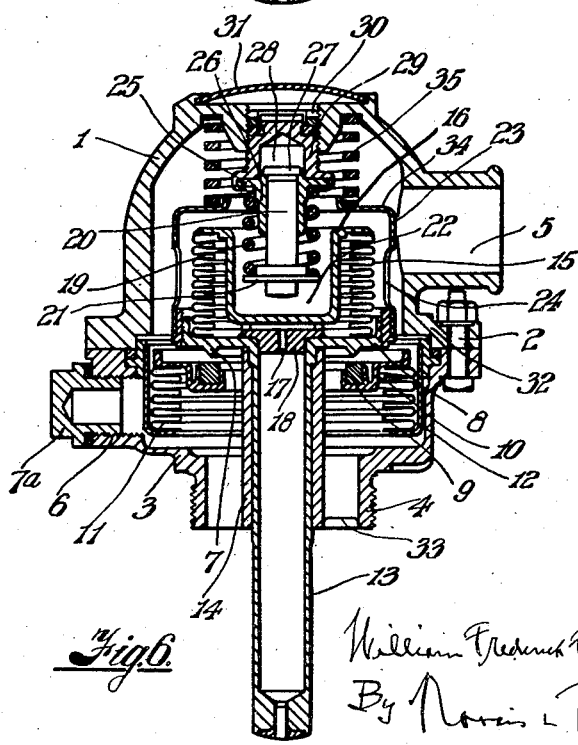

Fig. 1 is a sectional elevation of the valve showing the parts in the rest position, Fig. 2 is a sectional elevation showing the valve opening to relieve pressure during warming up of the system, Fig. 3 is a sectional elevation showing the valve closed, Fig. 4 is a sectional elevation showing the valve partially open, Fig. 5 is a sectional elevation showing the valve fully open and Fig. 6 is a sectional elevation showing the valve operating under vacuum.

In the construction illustrated the valve mechanism is enclosed in a casing comprising an upper part 1 which is adapted to be secured as by bolts 2 to a lower part 3 which is formed with a screw threaded spigot 4 to enable the casing as a whole to be secured into a filling aperture or other opening in the pipe or vessel to be protected. The upper part 1 of the casing has a lateral outlet 5 adapted for connection to a pipe conduit for carrying air or vapour to a suitable point where it can escape into the outer atmosphere. The lower casing component 3 has also a screw threaded hole 6 normally closed by a plug 7a but provided for the attachment of a pressure gauge connection if such is required.

Within the casing portion 1 is disposed the valve proper which comprises an annular knife edge 7 formed on the undersurface of a valve plate 8, the said knife edge annulus being adapted to co-operate with a seating ring 9 formed of a deformable material which is preferably synthetic rubber and which is pressed into a seat plate 10 whose peripheral portion is fixed to the upper end of a vacuum responsive metal bellows 11. The lower edge of the said bellows 11 is fixed to the inturned lower edge of an annular sheet metal holder 12 slidably mounted within the lower casing portion 3.

The valve plate 8 is formed integral with a phial 13 which extends downwards below the spigot 4 through a guide tube 14 fixed centrally in the lower casing portion 3 to which it is connected by radial webs 33. The guide tube 14 is so dimensioned that its upper edge serves as a stop to limit the downward travel of the valve plate 8.

The thermal element of the valve consists of a metallic bellows 15 fixed to a top plate 16 and to the valve plate 8. A through connection between the phial 13 and the interior of the bellows 15 is provided by a passage 17 in the plug 18 which otherwise closes the upper end of the phial. The bellows and phial are charged with the same fluid as is used for cooling the engine. A main blow-off spring 19, which is pre-loaded, is held in position on a rod 20 by a flange or plate 21 detachably fixed to the rod 20 near its lower end. The spring 19, rod 20 and plate 21 are accommodated within a central cylindrical depression 22 of the top plate 16. The valve plate 8 also carries fixed thereto a stop tube 23, ported as shown at 24, and the top 34 of which is inturned to act as a stop to limit the expansion of the thermal bellows 15. A light differential spring 35 disposed between the head of casing component 1 and the top 34 of the stop tube exerts a sufficient load on the stop tube 23 to maintain an internal pressure within the cooling system during the warming up period.

The upper end of spring 19 bears against the underside of a flange 25 formed on a sleeve 26 within which the rod 20 is freely slidable, the rod being formed with a head 27 which limits its downward movement and which is movable within a cylindrical recess 28 formed in a plug 29 screw-threaded in the upper portion of the casing part 1. This plug 29 whose lower end is formed to embrace and hold the flange 25, is formed at its upper end with notches or recesses 30 which enable a tool to be inserted when the cover 31 is removed so as to turn the said plug 29 to set the range of the instrument. Ordinarily, this setting is effected during assembly of the valve and the cover 31 can be sealed to prevent tampering with the valve during use.

The inner wall of the casing portion 1 is formed with a number of projections 32 to limit the upward movement of the bellows 11 and seat plate 10.

In Fig. 1 of the drawings the valve is shown when the system is cold and the valve plate 8 through its annular knife edge 7 is seated on the seating ring 9, so that the system under protection is closed against air or vapour entering or leaving it.

When warming up from cold, expansion of the coolant in the system may cause the internal pressure to exceed atmospheric in which case the complete thermal unit comprising the phial 13, the valve plate 8, the bellows 15 and the stop tube 23 will rise, compressing the spring 35 and thereby opening the valve to relieve the pressure. This condition of the valve is shown in Fig. 2. Air or vapour under pressure can then escape through the annular passage formed around the guide tube 14 and within the spigot 4, bellows 11 and seat plate 10 through which the air or vapour reaches the upper part of the housing 1 from whence it escapes through the outlet 5.

In the preferred arrangement the spring 35 is set so that the valve will open to relieve the internal pressure if it exceeds atmospheric by more than 8½ lbs. to 10½ lbs. per square inch. When the pressure within the header tank has fallen below this amount the valve will again close. Under all conditions of positive pressure within the system, however, the pressure will expand the bellows 11 upwards against its stops 32 as shown in Fig. 2.

Should the coolant temperature rise further than under the conditions above described, pressure will be generated in the system and acting upwards on the valve plate 8 will tend to lift it off its seat 9. At the same time the internal pressure in the thermal bellows 15 will increase due to the rise in temperature of the liquid in the phial 13 and the bellows 15 will expand. At a temperature of approximately 100° C. the bellows 15 will have expanded to an extent at which the central portion of the top plate 16 will bear upon the lower end of the rod 20 as shown in Fig. 3. In this condition, however, there is still a clearance between the top plate 16 and the shoulder 34 of the stop tube 23. Because the pressure inside the bellows 15 due to the charge is identical with the pressure in the header tank due to the coolant, and because the area of the valve seat 9 is equal to the effective area of the bellows 15, the total reaction will be taken by the main blow-off spring 19 except insofar as the differential spring 35 tends to keep the valve closed.

When the pressure in the header tank exceeds the saturated coolant vapour pressure at the prevailing temperature, the load on the underside of valve 8 due to the presence of incondensible gas, will be greater than the load produced by the pressure in bellows 15 acting on the upper side of valve 8. If this difference of pressure is greater than an amount determined by the strength of the spring 35 valve plate 8 carrying with it the complete thermal assembly will be lifted off its seat 9 as shown in Fig. 4 and will remain open until the pressure has again fallen to within a predetermined amount of the true vapour pressure of the coolant.

Referring next to Fig. 5, a further rise in temperature will cause the main blow-off spring 19 to become increasingly compressed and the bellows 15 to continue to expand upwards until its top plate 16 bears upon the shoulder 34 of the stop tube 23. At this and at all higher pressures the valve acts as a conventional safety valve, blowing off against the pressure of the main spring 19 which is so adjusted that the valve will crack at a pressure of 28-30 lbs. per square inch and will be fully open by 36 lbs. per square inch, which condition is illustrated in Fig. 5.

When the system is cooled, the internal pressure falls and a partial vacuum is formed. At a pressure of 2½ lbs. per square inch below atmospheric the bellows 11 collapses and thereby withdraws the valve seat 9 from contact with the valve element 7 which is prevented from descending by the top of the central guide tube 14 as already explained.

This operation of the valve under vacuum takes place with the parts in the positions shown in Fig. 6 and it permits air to be admitted through inlet 5 into the system until the internal pressure is increased to a minimum of 2½ lbs. per square inch below atmospheric pressure.

I claim:

1. A valve device for steam or pressure vessels, comprising a casing having an inlet and an outlet, a movable valve member for controlling flow through said casing, a temperature sensitive expansible chamber in said casing tending to close said valve member, a pre-loaded spring adapted to oppose opening of said valve member but to yield to relieve excessive pressure, a fixed stop against which the upper end of said spring abuts, a movable stop against which the lower end of said spring abuts, a freely mounted movable rod carrying said movable stop whose range of movement determines the maximum degree of movement of said valve member in opening to relieve excessive pressure, and a movable valve seat adapted to cooperate with said valve member but to yield independently thereof in response to a drop of inlet pressure below outlet pressure.

2. A valve device according to claim 1, including a socket adjustably mounted in the upper part of said casing, a head on said rod movable in but non-detachable from said socket, and a flange on said socket and a disc around the lower free end of the rod between which the said pre-loaded spring is mounted.

3. A valve device according to claim 1, including a central guide tube at the lower part of the valve housing, a phial connected to said expansible chamber and valve member and slidably mounted in said guide tube, and a stop formed at the upper end of said guide tube to limit the downward travel of the valve member.

4. A valve device according to claim 1, including a central cup shaped member depending within said expansible chamber from the top thereof and within which said rod and spring are accommodated, the base of said cup member providing a plate through contact with which the lower end of said rod and spring are brought into opposition to movement of said valve member.

5. A valve device for steam or pressure vessels, comprising a casing having an inlet and an outlet, a movable valve member for controlling flow through said casing, a temperature sensitive expansible bellows in said casing tending to close said valve member, a phial depending from said bellows and valve member, a guide tube in the lower part of said casing in which said phial is slidable, a stop formed at the upper end of said guide tube to limit the downward travel of the valve member, a central cup shaped member depending from the top of the bellows, a socket in the upper part of the casing and having a stop thereon, a rod axially movable in said socket and having a stop thereon, a control spring disposed between said stops on said socket and rod, a movable valve seat adapted to cooperate with said valve member but to yield independently thereof, and a number of stops projecting around the inner walls of the casing to limit the movement of said valve seat toward said valve member.

WILLIAM FREDERICK FORREST
MARTIN-HURST.